G. B. BRAND.
RIBBON SPOOL FOR TYPE WRITING MACHINES.
APPLICATION FILED JULY 22, 1907.

902,552.

Patented Nov. 3, 1908.

WITNESSES:
J. B. Reeves.
Charles E. Smith

INVENTOR:
George B. Brand
By Jacob Felbel
HIS ATTORNEY

UNITED STATES PATENT OFFICE.

GEORGE B. BRAND, OF SYRACUSE, NEW YORK, ASSIGNOR TO THE MONARCH TYPEWRITER COMPANY, OF SYRACUSE, NEW YORK, A CORPORATION OF NEW YORK.

RIBBON-SPOOL FOR TYPE-WRITING MACHINES.

No. 902,552.    Specification of Letters Patent.    Patented Nov. 3, 1908.

Application filed July 22, 1907. Serial No. 384,927.

*To all whom it may concern:*

Be it known that I, GEORGE B. BRAND, citizen of the United States, and resident of Syracuse, in the county of Onondaga and State of New York, have invented certain new and useful Improvements in Ribbon-Spools for Type-Writing Machines, of which the following is a specification.

My invention relates to ribbon spools for typewriting and like machines, and has for its object to provide at least cost a ribbon spool of simple and strong construction, and one that may be readily applied to and detached from a driving shaft or spindle.

To the above and other ends which will hereinafter appear, my invention consists in the features of construction, arrangements of parts and combinations of devices referred to in the following description and particularly pointed out in the appended claims.

Figure 1:
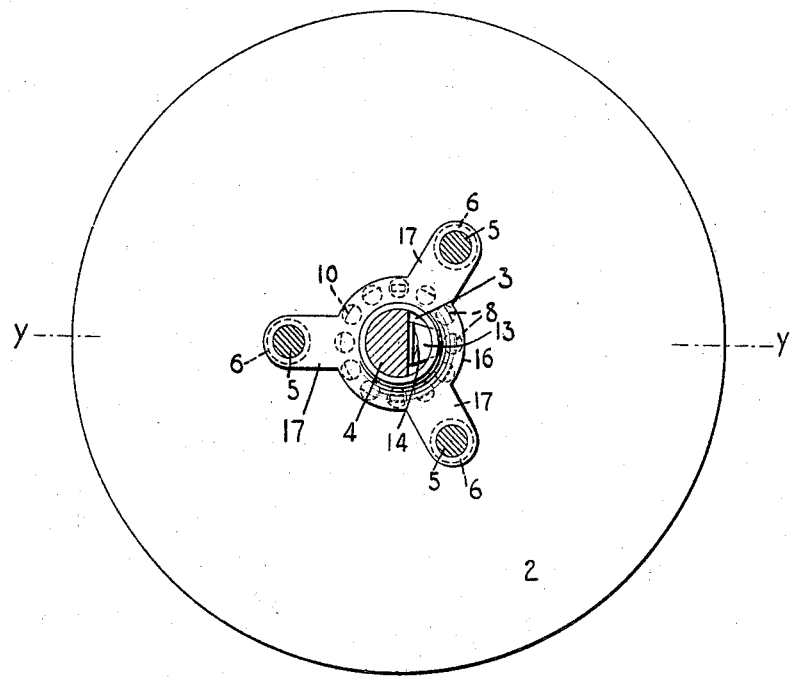
Figure 2:
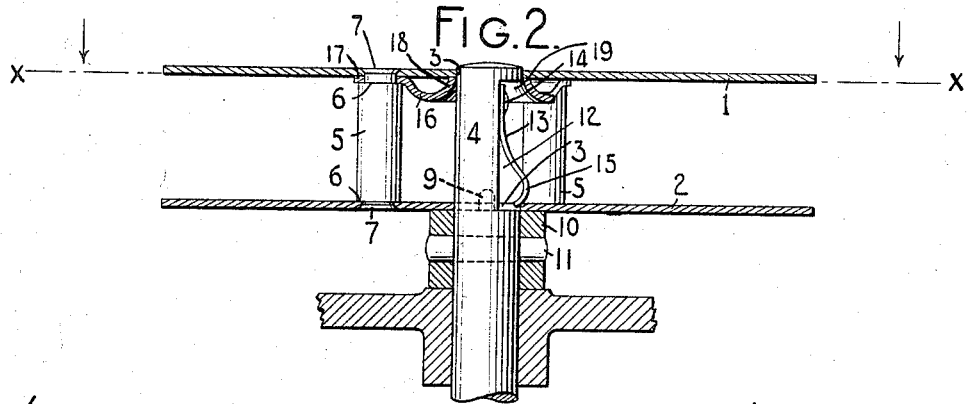

In the drawings, Figure 1 is a horizontal sectional view of a ribbon spool embodying my invention, the section being taken on the line $x$—$x$ of Fig. 2 and looking in the direction of the arrows at said line. Fig. 2 is a vertical sectional view of the same taken on the line $y$—$y$ of Fig. 1 and looking in the direction of the arrows at said line. In Fig. 2 as well as in Fig. 1 the ribbon spool is shown mounted upon its driving spindle.

The spool comprises flanges 1 and 2 with central perforations 3 therein for the reception of a driving spindle 4 suitably mounted and driven in the typewriter proper. The flanges are preferably made of sheet metal and are united and maintained spaced apart by posts or shouldered rivets 5, the shoulders of said rivets being indicated at 6 and the heads or ends thereof at 7. The rivets in the present instance are three in number and are arranged around and situated at uniform distances from the central perforations 3 in the flanges and constitute a core around which the ribbon is wound. The lowermost flange 2 has a series of circularly arranged perforations 8 for coöperation with engaging projections 9 that extend upwardly from a collar 10 secured to the driving spindle by a pin 11, as in the Monarch typewriter. That portion of the driving spindle which is contained within the ribbon spool is cut out or recessed at 12 for the reception of a leaf spring 13 secured at one end by a rivet 14. The free end portion of the spring is curved at 15 and normally extends outwardly beyond the surface of the driving spindle so as to form an engaging portion which coöperates with the wall of the central perforation 3 in the lowermost flange 2 to secure the spool against accidental displacement from the spindle 4.

In order to properly direct the upper flange of the spool upon the driving spindle 4, I provide a centering device 16, which is preferably made of sheet metal and has three arms 17 perforated near their outer ends for the reception of the upper contracted ends of the rivets 5, in order to secure the centering device between the upper shoulders 6 on the rivets and the upper flange of the ribbon spool. By these means the centering device, which is contained between the rivets, is securely united to the spool and is maintained adjacent to the upper flange thereof. The central portion of the centering device has a conoidal form as indicated at 18, with an inner sloping wall 19 and a central perforation for the reception of the driving spindle 4. The inner sloping wall of the centering device terminates at the central perforation 3 in the upper flange so that the central perforation in the centering device and the perforation 3 in the upper flange are in register. By these means the upper spool flange may be readily guided upon the upper end of the driving spindle. The centering device is flaring or bell-shaped with its widest portion or mouth downward so that however carelessly the spool may be put on, the free or upper end of the spindle will strike within the mouth and thus compel the proper seating or attachment of the spool. The lower flange may be readily slipped onto the spindle but without the centering device it is difficult and time-consuming to fit the upper flange to the spindle. By the use of this device a spool may now be quickly and properly fitted upon the spindle at both flanges.

What I claim as new and desire to secure by Letters Patent, is:—

1. A ribbon spool for typewriting machines comprising flanges with central perforations therein for the reception of a driving spindle, rivets which unite said flanges, and a centering device secured to the spool by said rivets and having a wall that slopes towards the central perforation in one of said flanges.

2. A ribbon spool for typewriting machines comprising flanges with central perforations therein for the reception of a driving spindle, a plurality of rivets which connect said flanges and form a core for the spool on which to wind the ribbon, and a centering device contained between said rivets and secured thereby to the spool and having a wall that slopes towards the central perforation in one of said flanges.

3. A ribbon spool for typewriting machines comprising flanges having central perforations therein for the reception of a driving spindle, shouldered rivets arranged around said central perforations and connecting said flanges and maintaining them spaced apart and forming a core for the spool and around which the ribbon is wound, and a centering device comprising a sheet metal plate having a central perforation therein which registers with a central perforation in one of said flanges and also having a sloping wall which terminates at the central opening in the flange.

4. A ribbon spool for typewriting machines comprising flanges having central perforations therein for the reception of a driving spindle, three shouldered rivets situated at equal distances from said central perforation, said rivets connecting said flanges and maintaining them spaced apart and forming a core for the spool and around which the ribbon is wound, and a centering device for guiding the spool on a driving spindle, said centering device comprising a conoidal central portion which registers with a central opening in one of said flanges, and a set of perforated arms for the reception of said rivets and by means of which the centering device is secured to the ribbon spool.

Signed at Syracuse, in the county of Onondaga, and State of New York this 18th day of July A. D. 1907.

GEORGE B. BRAND.

Witnesses:
ALBERT KUNTZ,
ARTHUR H. CRITTENDEN.